Dec. 26, 1922.

O. E. MERRILL.
INTERCONVERTIBLE MOWER AND SWEEPER DEVICE.
FILED SEPT. 29, 1921.

1,439,832

Witness:
Dave S. Magnusson

Inventor:
Orson E. Merrill
By Luther Johns
Atty.

Patented Dec. 26, 1922.

1,439,832

UNITED STATES PATENT OFFICE.

ORSON E. MERRILL, OF BELOIT, WISCONSIN.

INTERCONVERTIBLE MOWER AND SWEEPER DEVICE.

Application filed September 29, 1921. Serial No. 504,199.

*To all whom it may concern:*

Be it known that I, ORSON E. MERRILL, a citizen of the United States, residing at Beloit, Rock County, Wisconsin, have invented a certain new and useful Interconvertible Mower and Sweeper Device, of which the following is a specification.

The present invention relates to mowers and sweepers, and its principal object is to provide means whereby a mower having a revoluble cutting member and adapted to the cutting of grass on lawns, etc., may readily be converted into a sweeper for cleaning the lawn of the cut grass, leaves, etc., which means may readily be removed and the machine re-converted into a mower. It is also an object to accomplish these advantageous results by simple, cheap and conveniently-operated means.

Figure 1:
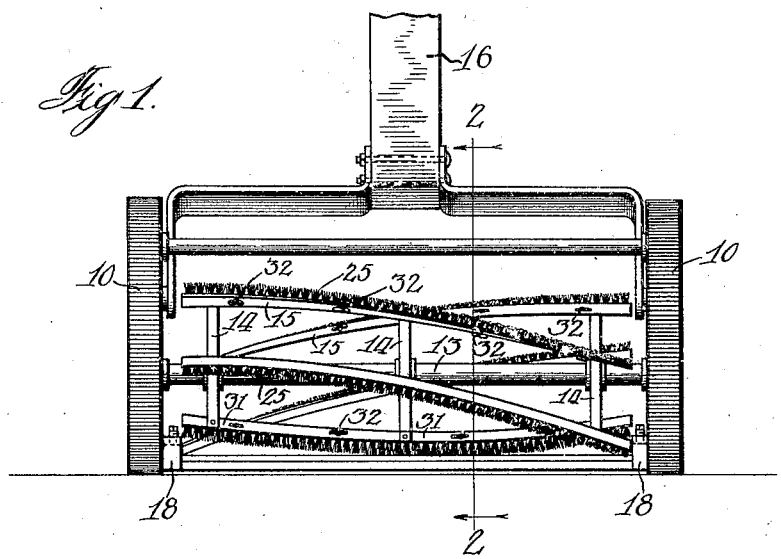
Figure 2:
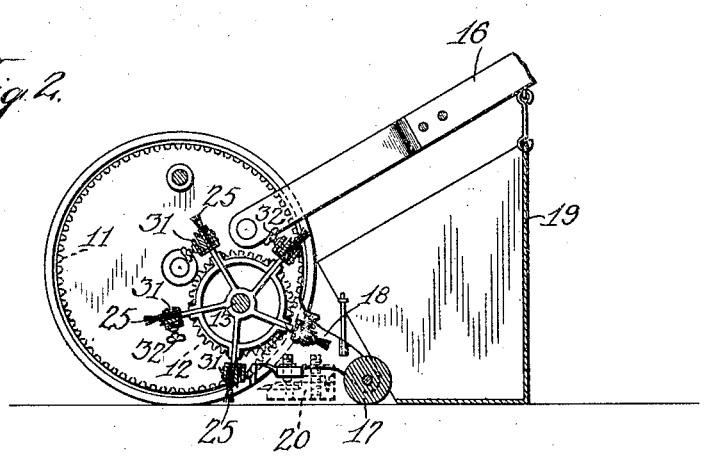
Figure 3:
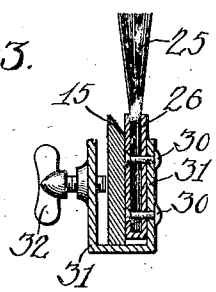
Figure 4:
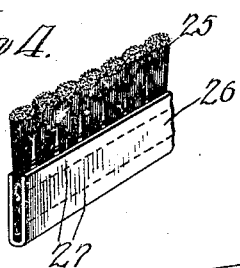
Figure 5:
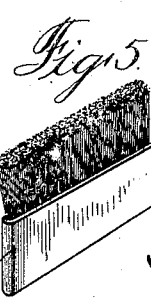

In the accompanying drawings, which form a part of this specification, Figure 1 is a front view of a mowing device of conventional form, ordinarily called a lawn mower, having these improvements applied thereto, and thus being converted into a sweeper; Fig. 2 is a sectional view through Fig. 1 as on the line 2—2 thereof; Fig. 3 is an enlarged sectional view through one of the cutting blades, clamp and attached brush; and Figs. 4 and 5 are fragmentary perspectives of strip brushes of different constructions.

The mower illustrated has a pair of side traction wheels 10 having the internal driving gear 11 meshing with the pinion 12 on the shaft 13 which carries positively the spiders 14 upon which are secured cutting blades 15, the device being driven by the pushing handle 16. It has a roller 17 carried by a frame extension 18 on each side of the machine and a receptacle 19 adapted to catch the grass cut by the machine. The mower illustrated is according to common practice and is too well known to require more than a general description.

In Fig. 2 the dotted lines at 20 indicate a part of the mower with which the blades 15 coact in cutting the grass. It is carried by the frame part 18 and is adjustably and readily removably secured by bolts.

This bed plate member 20 is shown as having been removed from Fig. 1 and is shown by dotted lines in Fig. 2 to illustrate in a conventional way its relative location and arrangement, and as a part readily removable from the machine proper. In converting the lawn mower into a sweeper this bed plate 20 will be removed in order to give free action to the brush device.

To constitute the device a sweeper I further provide a sweeping device formed as an attachment for the revoluble cutter member comprising the shaft 13, spiders 14 and blades 15. This revoluble cutting member may, of course, have various forms and other details of construction according to the design or plan adopted by different manufacturers of the mowing machine, and the present invention is not limited to a revoluble cutting member of the specific form shown.

In the accompanying drawings the brush device is shown as a plurality of brushes in strip form, each having a length substantially that of the cutting blades 15, the strip brushes being secured readily removably to the blades respectively.

The fragmentary view of Fig. 4 shows a plurality of tufts 25 held within the folds of a piece of flexible material such as fabric or leather 26, as by rows of stitching 27. In Fig. 5 the tufts or bristles 28 may be considered as being embedded within a strip of composition 29, for instance a rubber compound, as by a vulcanizing or other hardening process. The strip brushes themselves may be formed according to any approved practice.

In Fig. 3 the relationship of a strip brush to a cutting blade as 15 is shown, and from this figure it will be noted that the strip brush is secured as by rivets 30 to a yoke-like clamp 31 having a thumb screw 32 adapted to bind the brush firmly upon the blade 15. A plurality of such clamps 31 are secured to the brushes at intervals, as shown by Fig. 1, and when it is desired to apply a brush to a blade it is simply necessary to slip the brush into place upon the blade and clamp it there by means of the thumb screw 32, the operation being simply and expeditiously performed and the subsequent removal of the brushes being equally simple and easy. With the clamps 31 permanently secured to the brushes the application of the brushes to the blades is facilitated and the further advantage is had of preserving the small clamps against loss.

An important advantage of the present construction is that a highly effective sweeper may be formed from the ordinary lawn mower or similar device, at a very small expense and with a very small expenditure of labor. Such a device is highly important not only for collecting the cut grass, but from time to time for removing leaves and other objectionable matter from the lawn, as in the fall of the year when the presence of tree leaves is both unsightly and objectionable to the satisfactory operation of mowing the lawn. The laborious work of sweeping the lawn with the ordinary broom is thus avoided, and with comparatively little effort the lawn may be kept clean, and by means of the mower machine already at hand, with the modifications thereof as herein pointed out.

I contemplate as being within the scope of these improvements various departures from what is specifically shown, as indicated in the appended claims.

I claim:

1. In combination, a mower having a revoluble cutting member, a brush device attachable to the revoluble member, and means for securing the brush device upon the revoluble member to form a sweeper of the character described.

2. The combination of a mower of the character described having a revoluble member including cutting blades, and brush elements adapted for attachment to the blades respectively and carried thereby, for the purpose set forth.

3. The combination of a mower of the character described having a revoluble member including cutting blades, a plurality of brush elements in strip form substantially the length of the blades respectively, and clamping means carried by the brush elements for readily attaching them to the blades respectively.

ORSON E. MERRILL.